United States Patent
Korver et al.

(10) Patent No.: US 9,277,530 B2
(45) Date of Patent: Mar. 1, 2016

(54) DELIVERY OF PUSH NOTIFICATIONS TO AN INACTIVE COMPUTING DEVICE

(71) Applicant: Apple Inc., Cupertino, CA (US)

(72) Inventors: Brian E. Korver, Cupertino, CA (US); Jason R. Thorpe, Cupertino, CA (US); Gokul P. Thirumalai, Cupertino, CA (US); Justin Wood, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,698

(22) Filed: May 30, 2014

(65) Prior Publication Data
US 2015/0351075 A1    Dec. 3, 2015

(51) Int. Cl.
*H04W 4/14* (2009.01)
*H04W 68/02* (2009.01)
*H04W 4/00* (2009.01)
*H04W 52/02* (2009.01)
*H04W 8/22* (2009.01)

(52) U.S. Cl.
CPC .............. *H04W 68/02* (2013.01); *H04W 4/003* (2013.01); *H04W 8/22* (2013.01); *H04W 52/0209* (2013.01)

(58) Field of Classification Search
CPC .................................. H04W 4/12; H04W 4/14
USPC ................... 455/445, 458, 461, 412.1, 412.2, 455/413.414, 1, 466; 379/88.12, 100.06, 379/144.07
See application file for complete search history.

(56) References Cited

U.S. PATENT DOCUMENTS

| | | | | |
|---|---|---|---|---|
| 8,634,810 | B2* | 1/2014 | Barkie | H04W 12/10 455/410 |
| 8,943,194 | B2* | 1/2015 | Colbert | G06Q 50/32 709/223 |
| 8,996,069 | B2* | 3/2015 | Guo et al. | 455/566 |
| 2011/0096706 | A1* | 4/2011 | Ramasamy | H04W 68/12 370/310 |
| 2013/0132573 | A1* | 5/2013 | Lindblom | 709/225 |
| 2013/0190032 | A1* | 7/2013 | Li | 455/517 |
| 2013/0346521 | A1* | 12/2013 | Arabo | H04L 29/08693 709/206 |
| 2014/0364104 | A1* | 12/2014 | Wood | H04W 4/00 455/418 |
| 2015/0181555 | A1* | 6/2015 | Dey | H04W 68/005 455/412.2 |
| 2015/0208211 | A1* | 7/2015 | Guo | H04M 1/57 455/412.2 |
| 2015/0237151 | A1* | 8/2015 | Lau | H04L 67/26 709/206 |

* cited by examiner

*Primary Examiner* — Cong Tran
(74) *Attorney, Agent, or Firm* — Fish & Richardson P.C.

(57) ABSTRACT

A method performed by a notification handler process running on a device includes receiving a first push notification for a first application while the recipient device is inactive; determining that delivery of the first push notification would cause the device to become active without prompting a user of the device to interact with the first application; in response to determining what delivery of the first push modification would cause, locally storing the first push notification; receiving a second push notification for a second application while the recipient device is still inactive; determining that delivery of the second push notification would cause the device to become active prompting the user to interact with the second application; and in response to determining what delivery of the second push modification would cause, delivering the received second push notification to the second application and the stored first push notification to the first application.

26 Claims, 7 Drawing Sheets

DELIVERY OF PUSH NOTIFICATIONS TO AN INACTIVE COMPUTING DEVICE

TECHNICAL FIELD

The disclosure generally relates to technologies for delivering push notifications to an inactive computing device, e.g., for selectively activating the device to deliver a push notification for an application installed on the device based on whether delivery of the push notification causes prompting of a user associated with the device to interact with the application.

BACKGROUND

Battery-powered computing devices, e.g., laptops, smart phones, MP3 players, etc., are configured to transition from an active state to an inactive state—after a user associated with the device has stopped using the device—to prolong its battery life. From the user's perspective, a battery-powered computing device is in an inactive state if at least the device's display is dark, no sounds are played and the device's fans do not come on. Additionally, if the device has a clam shell, the latter also can be closed when the device is inactive.

While the battery-powered computing device is in the inactive state, some of computing resources of the device, e.g., a service processor, etc., may occasionally perform some tasks (backup, maintenance, etc.) without the user being aware. In addition, although the battery-powered computing device is in the inactive state, a communication module of the device maintains active a communication channel between a notification handler process running on the device and a cloud-based notification server. In this manner, notifications for applications (apps) installed on the device are received from the cloud-based notification server through the active communication channel. Examples of such applications are calendar app, contacts app, image library organizer app, lost-device locator app, voice over Internet protocol (VoIP) app, video conference app, etc.

Conventionally, upon receipt of each notification, the notification handler process causes activation of the device and delivers the received notification to a corresponding application. Once the battery-powered computing device transitions from the inactive state to the active state, additional computing resources are used for running the app to which the received notification was delivered. As such, consumption of the battery life associated with the active state of the device is faster relative to the consumption associated with the inactive state of the device.

SUMMARY

In accordance with the disclosed technologies, a battery-powered computing device is selectively activated to deliver a push notification for an application (app) installed on the device based on whether delivery of the push notification causes prompting of a user associated with the activated device to interact with the app.

For instance, a record including identifiers of restricted apps, also referred to as a red-list, is generated and maintained at the battery-powered device. The restricted app identifiers correspond to apps installed on the battery-powered device for which delivery of push notifications would cause the device to transition into the active state without prompting a user associated with the device to interact with the respective installed applications. Examples of such red-listed apps are calendar app, contacts app, image library organizer app, etc.

If a push notification for a red-listed app is received at the battery-powered computing device when the device is in an inactive state, then a notification handler process running at the device temporarily stores the push notification received for the red-listed app in a data store at the device without causing the device to transition from the inactive state to an active state.

In contrast with the red-listed apps, other apps installed on the battery-powered device are such that delivery of push notifications would cause the device to transition into the active state prompting the user to interact with the respective installed applications. As their identifiers are not included in the red-list, the foregoing apps are referred to as the non-red-listed apps. Examples of such non-red-listed apps are lost-device locator app, voice over Internet protocol (VoIP) app, video conference app, etc. If a push notification for a non-red-listed app is received at the battery-powered computing device when the device is in the inactive state, then the notification handler process causes the device to transition from the inactive state to the active state. In addition to causing activation of the battery-powered computing device, the notification handler process also delivers the notification received for the non-red-listed app along with the notification stored for the red-listed app.

In general, one aspect of the subject matter described in this specification can be implemented in a method performed by a notification handler process running on a computing device. The method includes receiving a first push notification for a first application while the recipient device is in an inactive state; determining that delivery of the first push notification would cause the recipient device to transition into an active state without prompting a user associated with the device to interact with the first application; in response to determining what delivery of the first push modification would cause, storing the first push notification at the recipient device; receiving a second push notification for a second application while the recipient device continues to be in the inactive state; determining that delivery of the second push notification would cause the device to transition into the active state prompting the user to interact with the second application; and in response to determining what delivery of the second push modification would cause, delivering the received second push notification to the second application and the stored first push notification to the first application.

The foregoing and other implementations can each optionally include one or more of the following features, alone or in combination. In some implementations, the recipient device is in the inactive state when at least a display of the recipient device is dark while the recipient device is running on battery power.

In some implementations, determining that delivery of a push notification would cause the recipient device to transition into the active state without prompting the user to interact with a particular application can include parsing a record of restricted application identifiers stored at the recipient device. The restricted application identifiers correspond to applications installed on the recipient device for which delivery of push notifications would cause the recipient device to transition into the active state without prompting the user to interact with the respective installed application. Additionally, the foregoing determination further includes finding an identifier of the particular application among the restricted application identifiers of the stored record.

Moreover, determining that delivery of a push notification would cause the recipient device to transition into the active state prompting the user to interact with a particular application can include parsing the record of restricted application identifiers stored at the recipient device without finding the identifier of the particular application among the restricted application identifiers of the stored record.

In some implementations, the method further can include generating the record of restricted application identifiers upon detecting that the recipient device transitions from the active state to the inactive state. In some cases, the method further can include generating a first record of application identifiers including application identifiers of applications installed on the recipient device. Generating the record of restricted application identifiers can include removing from the first record of application identifiers the application identifiers of ones from among the installed applications that indicated, to the notification handler process via either user input or an API, that receipt of push notifications would prompt the user to interact with the respective installed application.

In some cases, the method further can include transmitting, via a public IP connection to a notification server associated with the notification handler process, a copy of the record of restricted application identifiers generated by the recipient device, such that the notification server can (i) temporarily store, at the notification server, push notifications for applications installed on the recipient device that have application identifiers included on the copy of the record of restricted application identifiers, and (ii) opportunistically push the stored notifications along with a notification for an application installed on the recipient device that has an unrestricted application identifier.

In some implementations, the method further can include incrementing a count of user disinterest with respect to the second application upon detecting that the user fails to interact with the second application prior to the recipient device transitioning from the active state back to the inactive state. Here, if the count exceeds a predetermined count, the method further includes entering an application identifier of the second application into the record of restricted application identifiers when generating at least some of subsequent instances of the record of restricted application identifiers, and resetting the count to zero.

In some implementations, the method further can include removing the record of restricted application identifiers from the recipient device's storage upon detecting that the recipient device transitions from the inactive state to the active state.

Further, the method further can include receiving a third push notification for the first application while the recipient device continues to be in the active state; and delivering the received third push notification to the first application without having to store the third push notification at the recipient device.

Furthermore, the method further can include transmitting, via a public IP connection to a notification server associated with the notification manager, an instruction to remove a copy of the record of restricted application identifiers—provided by the recipient device—from storage at the notification server.

In some implementations, delivering the received second push notification to the second application and the stored first push notification to the first application can include inquiring a resource manager process running on the recipient device whether transitioning the recipient device from the inactive state to the active state in response to the delivery of the first and second push modifications would cause performance of the recipient device to degrade below an acceptable performance threshold; and receiving a false response to the inquiry.

In some implementations, the method further can include: receiving a fourth push notification for the second application after the recipient device returned to the active state; inquiring a resource manager process running on the recipient device whether transitioning the recipient device from the inactive state to the active state in response to delivery of the fourth push modification would cause performance of the recipient device to degrade below an acceptable performance threshold; and upon receiving a true response to the inquiry, instructing the recipient device to remain inactive and storing the fourth push notification at the recipient device along with any other push notification(s) stored at the recipient device. Here, the method further can include, receiving, from the resource manager process, indication that transitioning the recipient device from the inactive state to the active state would not cause the performance to degrade below the acceptable performance threshold; and in response to receiving the indication, instructing activation of the recipient device and delivering the stored fourth push notification to the second application along with any other stored push notification(s).

In general, another aspect of the subject matter described in this specification can be implemented in a computing device that includes one or more hardware processors; and non-transitory computer readable medium encoding instructions that, when executed by the one or more hardware processors, cause the one or more hardware processors to emulate a notification handler that performs operations including receiving a first push notification for a first application while the computing device is in an inactive state; determining that delivery of the first push notification would cause the computing device to transition into an active state without prompting a user associated with the computing device to interact with the first application; in response to determining what delivery of the first push modification would cause, storing the first push notification at the computing device; receiving a second push notification for a second application while the computing device continues to be in the inactive state; determining that delivery of the second push notification would cause the computing device to transition into the active state prompting the user to interact with the second application; and in response to determining what delivery of the second push modification would cause, delivering the received second push notification to the second application and the stored first push notification to the first application.

The foregoing and other implementations can each optionally include one or more of the following features, alone or in combination. In some implementations, the computing device is in the inactive state when at least a display of the computing device is dark while the computing device is running on battery power.

In some implementations, the operation of determining that delivery of a push notification would cause the computing device to transition into the active state without prompting the user to interact with a particular application can include parsing a record of restricted application identifiers stored at the computing device, the restricted application identifiers corresponding to applications installed on the computing device for which delivery of push notifications would cause the computing device to transition into the active state without prompting the user to interact with the respective installed application; and finding an identifier of the particular application among the restricted application identifiers of the stored record.

Moreover, the operation of determining that delivery of a push notification would cause the computing device to transition into the active state prompting the user to interact with a particular application can include parsing the record of restricted application identifiers stored at the computing device without finding the identifier of the particular application among the restricted application identifiers of the stored record.

In some implementations, the operations further can include generating the record of restricted application identifiers upon detecting that the computing device transitions from the active state to the inactive state. In some cases, the operations further can include generating a first record of application identifiers including application identifiers of applications installed on the computing device. The operation of generating of the record of restricted application identifiers can include removing from the first record of application identifiers the application identifiers of ones from among the installed applications that indicated, to the notification handler process via either user input or an API, that receipt of push notifications would prompt the user to interact with the respective installed application.

In some cases, the operations further can include transmitting, via a public IP connection to a notification server associated with the notification handler process, a copy of the record of restricted application identifiers generated by the computing device, such that the notification server can (i) temporarily store, at the notification server, push notifications for applications installed on the computing device that have application identifiers included on the copy of the record of restricted application identifiers, and (ii) opportunistically push the stored notifications along with a notification for an application installed on the computing device that has an unrestricted application identifier.

In some implementations, the operations further can include incrementing a count of user disinterest with respect to the second application upon detecting that the user fails to interact with the second application prior to the computing device transitioning from the active state back to the inactive state. Here, if the count exceeds a predetermined count, the operations further include including an application identifier of the second application to the record of restricted application identifiers when generating at least some of subsequent instances of the record of restricted application identifiers; and resetting the count to zero.

In some implementations, the operations further can include removing the record of restricted application identifiers from the computing device's storage upon detecting that the computing device transitions from the inactive state to the active state.

Further, the operations can include receiving a third push notification for the first application while the computing device continues to be in the active state; and delivering the received third push notification to the first application without having to store the third push notification at the computing device.

Furthermore, the operations can include transmitting, via a public IP connection to a notification server associated with the notification manager, an instruction to remove a copy of the record of restricted application identifiers—provided by the computing device—from storage at the notification server.

In some implementations, the operation of delivering of the received second push notification to the second application and the stored first push notification to the first application can include: inquiring a resource manager process running on the computing device whether transitioning the computing device from the inactive state to the active state in response to the delivery of the first and second push modifications would cause performance of the computing device to degrade below an acceptable performance threshold; and receiving a false response to the inquiry.

In some implementations, the operations further can include receiving a fourth push notification for the second application after the computing device returned to the active state; inquiring a resource manager process running on the computing device whether transitioning the computing device from the inactive state to the active state in response to delivery of the fourth push modification would cause performance of the computing device to degrade below an acceptable performance threshold; and upon receiving a true response to the inquiry, instructing the computing device to remain inactive and storing the fourth push notification at the computing device along with any other push notification(s) stored at the computing device. Here, the operations further can include: receiving, from the resource manager process, indication that transitioning the computing device from the inactive state to the active state would not cause the performance to degrade below the acceptable performance threshold; and in response to receiving the indication, instructing activation of the computing device and delivering the stored fourth push notification to the second application along with any other stored push notification(s).

Particular implementations of the subject matter described in this specification can be configured so as to realize one or more of the following potential advantages.

The above opportunistic notification delivery mechanism of the notifications for the red-listed apps from among the installed apps beneficially contributes to prolonging battery life of the battery-powered computing device relative to the conventional notification delivery mechanism that activates the device to deliver notifications received for each of the installed apps.

Further to prolong the battery life of the battery-powered computing device, the disclosed notification handler process can "penalize" a given non-red-listed app by adding an identifier of the given app to the red list based on a measure of user disinterest in the given app. For example, the user disinterest can be measured as a time interval (e.g., 30 sec, 1 min, 3 min, etc.) the given app remains unused since activation of the device and delivery of the received notification to the given app. As another example, the user disinterest can be measured in terms of a rate of activating the device and delivering the received notifications to the given app (e.g., 10, 20 or 60 notification deliveries/h) while the given app remains unused. As another example, the user may explicitly express disinterest by setting a configuration parameter.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
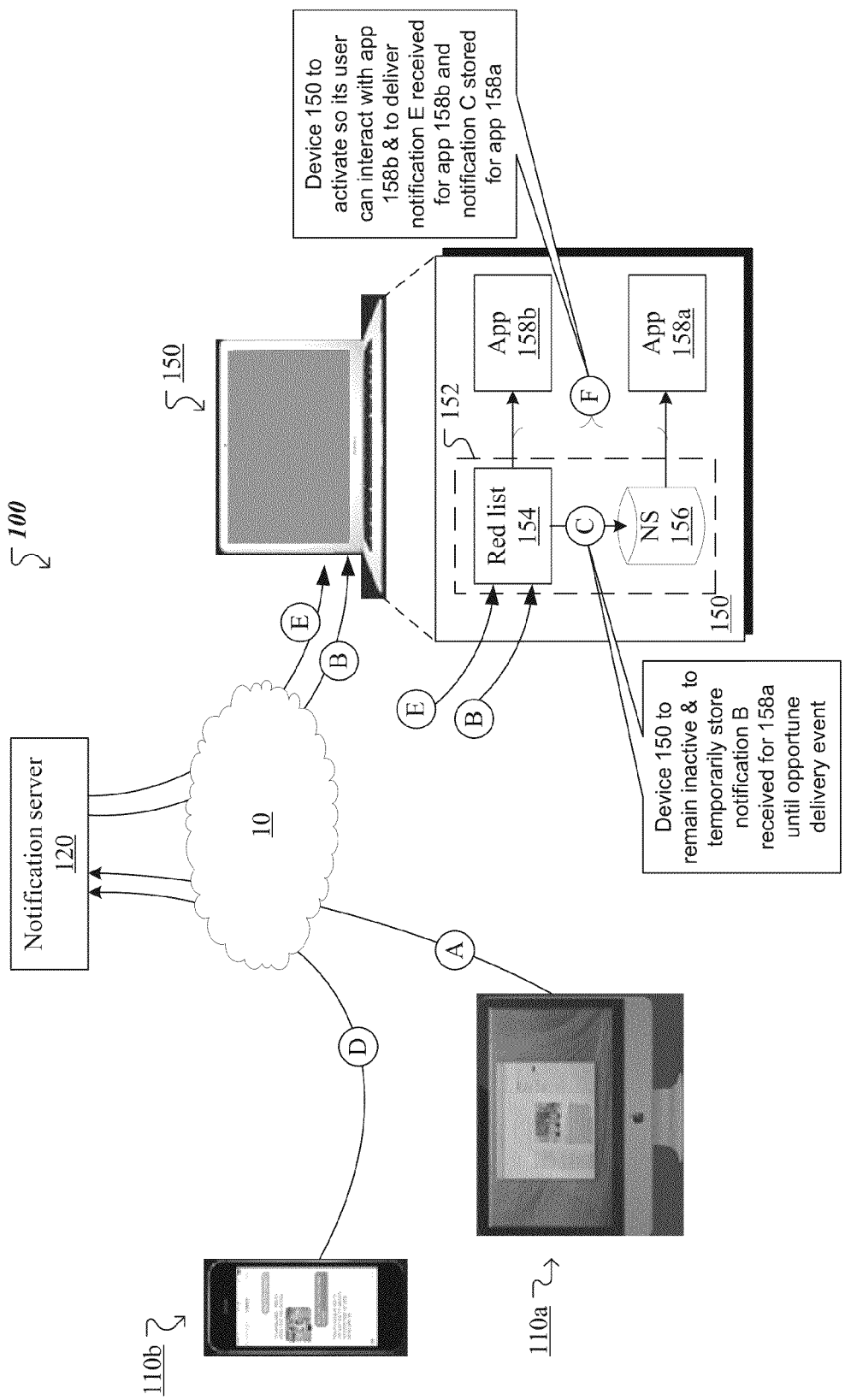
FIG. 1 illustrates an example of a system for selectively activating a battery-powered computing device to deliver push notifications for apps installed on the device.

In accordance with the disclosed technologies, a notification handler process running on a battery-powered computing device generates and maintains a red-list to account for apps installed on the device for which delivery of push notifications, when the device is in an inactive state, would cause the device to transition into an active state without prompting a user associated with the device to interact with the respective installed applications. Examples of red-listed apps are calendar app, contacts app, image library organizer app, etc. In contrast, apps installed on the battery-powered computing device that are not red-listed are apps for which delivery of push notifications, when the device is in the inactive state, would cause the device to transition into the active state prompting the user to interact with the respective installed applications. For instance, some of the apps that are not red-listed display, upon receiving of a notification, a user interface on a locked screen of the device. Examples of apps installed on the device that typically are not red-listed are lost-device locator app, voice over Internet protocol (VoIP) app, video conference app, etc.

In some implementations, upon receipt from a cloud-based notification server of push notifications for the red-listed apps when the battery-powered computing device is inactive, the notification handler process stores at the device the push notifications received for the red-listed apps, instead of delivering them to the respective red-listed apps. Most importantly, the battery-powered computing device remains inactive upon receipt of the notifications for the red-listed apps. Moreover, upon receipt from the cloud-based notification server of push notifications for the apps that are not red-listed when the device is still inactive, the notification handler process causes the battery-powered computing device to become active and delivers the push notifications received for the apps that are not red-listed to the corresponding apps. Because at this point the power resources for activating the battery-powered computing device have already been spent, the notification handler process opportunistically delivers all other notifications stored at the device for the red-listed apps to the corresponding apps.

In other implementations, the above logic can be implemented at the cloud-based notification server. Here, a copy of the red-list generated at the battery-powered computing device is provided to the notification server when the device is inactive. Upon receipt from notification providers of push notifications for the red-listed apps installed on the battery-powered computing device, the notification server stores at the notification server the push notifications received for the red-listed apps, instead of transmitting them to the battery-powered computing device. In this manner, the battery-powered computing device will remain inactive upon receipt of the notifications for the red-listed apps at the notification server. Moreover, upon receipt from notification providers of push notifications for the non-red-listed apps installed on the battery-powered computing device, the notification server transmits the push notifications received for the apps that are not red-listed to the on the battery-powered computing device. Because this transmission causes the battery-powered computing device to become active, the notification server may opportunistically transmit all other notifications stored at the notification server for the red-listed apps to the battery-powered computing device.

These and other aspects are described in detail in the following sections.

Selectively Activating Recipient Device to Deliver Push Notifications Using Notification Handler Run by Recipient Device FIG. 1 illustrates an example of a system 100 for selectively activating a recipient device 150 to deliver push notifications for apps installed on the device 150. In this example, the system 100 includes, in addition to the recipient device 150, notification provider devices 110a, 110b and a cloud-based notification service. Here, the cloud-based notification service includes a local component running on the recipient device 150 and another component running remotely from the recipient device 150. The remote component is a notification server 120 running on a computer system associated with the cloud-based notification service. The local component is a notification handler 152 running on the recipient device 150. The notification handler 152 is connected as a client to the notification server 120 through a persistent network connection.

The network 10 over which the notification handler 152 and the notification server 130 communicate with each other can be the Internet, a wide area network (WAN) or a combination thereof. The persistent network connection between the notification handler 152 and the notification server 130 is maintained by the cloud-based notification service over communication channels of one or more of cell networks, WiFi networks, cable networks, etc. Communications between the notification handler 152 and the notification server 120 over such a persistent network connection are carried out through transmission control protocol (TCP), for instance.

The recipient device 150 is a computing device, e.g., a laptop, smart phone, MP3 player, etc., that typically is battery powered. As such, the recipient device 150 is configured to transition from an active state to an inactive state—after a user associated with the device has stopped using the device—to prolong its battery life.

Multiple apps are installed on the recipient device 150. A first category of apps, e.g., calendar apps, contacts apps, image library organizer apps, etc., is such that delivery of push notifications for an app 158a from the first category would cause the recipient device 150 to transition from an inactive state into an active state without prompting the user to interact with the app 158a. Identifiers of the apps from the first category are included in a red list 154 generated and maintained by the notification handler 152. As such, the app 158a is referred to as a red-listed app. A second category of apps, e.g., lost-device locator app, voice over Internet protocol (VoIP) app, video conference app, etc., is such that delivery of push notifications for an app 158b from the second category would cause the recipient device 150 to transition from the inactive state into the active state prompting the user to interact with the app 158b. Identifiers of the apps from the second category are left out of the red list 154.

Some apps (e.g., apps native to an operating system running on the recipient device 150) indicate through an API to the notification handler 152 that they are to activate the recipient device 150 to receive notifications. Some apps (native apps or third party apps) have associated preference information (e.g., stored in a preference file) indicating to the notification handler 152 that they are to activate the recipient device 150 to receive notifications. The foregoing apps fall into the second category of apps that are not on the red list 154. Remaining apps installed on the recipient device 150, that do not indicate to the notification handler 152 that they are to activate the recipient device 150 to receive notifications, are, by default, placed on the red list 154 by the notification handler 152.

Moreover, when the recipient device 150 transitions from the active state to the inactive state (to prolong battery life), the notification handler 152 can generate the red list 154 in the following manner. Identifiers of all apps installed on the recipient device 150 are included in a first record. Then, the notification handler 152 verifies preferences of the installed apps to determine whether they are to activate the recipient device 150 to receive notifications. The identifiers of such apps are removed from the first record, and the revised record represents the red list 154. In this manner, the red list 154 is updated at least every time the recipient device 150 transitions from the active state to the inactive state, such that if notification preferences of a given app—that previously had not been on the red list 154—have changed, an identifier of the given app will be included in the updated red list 154.

In addition, the red list 154 is dropped by the notification handler 152 upon transition of the recipient device 150 from the inactive state to the active state. In this manner, notifications received by the recipient device 150 in its active state are delivered without delay to the corresponding apps, whether or not the notifications are for apps that had been red-listed when the recipient device 150 was inactive.

The red list 154 is used by the notification handler 152 to manage deliveries of notifications to the apps installed on the recipient device when the notifications are received at the recipient device 150 in its inactive state.

For instance, an update relating to the app 158a occurs on another computing device 110a associated with the recipient device 150. Information (A) about the update relating to the app 158a is transmitted by the computing device 110a to the notification server 120. Here, the notification server 120 packages the information (A) into a notification (B) for the app 158a installed on the recipient device 150. The notification (B) includes an identifier of the recipient device 150 and an identifier of the app 158a. Then, the notification server 120 pushes the notification (B) for the app 158a to the recipient device 150. In the example illustrated in FIG. 1, the notification (B) for the app 158a is received from the notification server 120 at the recipient device 150 when the device is inactive. The notification handler 152 checks whether the identifier of the app 158a specified in the received notification (B) is on the red list 154. In this case, the notification handler 152 determines that the app 158a is red-listed. Responsive to the determination that the app 158a is red-listed, the notification handler 152 issues an instruction (C) that the device 150 remain inactive and temporarily store the notification (B) received for the red-listed app 158a in the local notification store 156.

Further, a video call relating to the app 158b originates at another computing device 110b. Information (D) about the video call relating to the app 158b is transmitted by the computing device 110b to the notification server 120. Here, the notification server 120 packages the information (D) into a notification (E) for the app 158b installed on the recipient device 150. The notification (E) includes the identifier of the recipient device 150 and an identifier of the app 158b. Then, the notification server 120 pushes the notification (E) for the app 158b to the recipient device 150. In the example illustrated in FIG. 1, the notification (E) for the app 158b is received from the notification server 120 at the recipient device 150 when the device is still inactive. The notification handler 152 checks whether the identifier of the app 158b specified in the received notification (E) is on the red list 154. In this case, the notification handler 152 determines that the app 158b is not on the red-list 154. Responsive to the determination that the app 158b is not on the red-list 154, the notification handler 152 issues an instruction (F) that the device 150 activate and delivers the notification (E) received for the 158b that is not on the red-list 154 and the notification (B) stored for the red-listed app 158a.

As noted above, because the recipient device 150 has transitioned from the inactive state to the active state, the notification handler 152 drops the red list 154. In this manner, notifications received by the recipient device 150 while in its active state are delivered without delay to the corresponding apps, regardless of whether the notifications are received for apps that had been red-listed when the recipient device 150 was inactive.

Figure 2A:
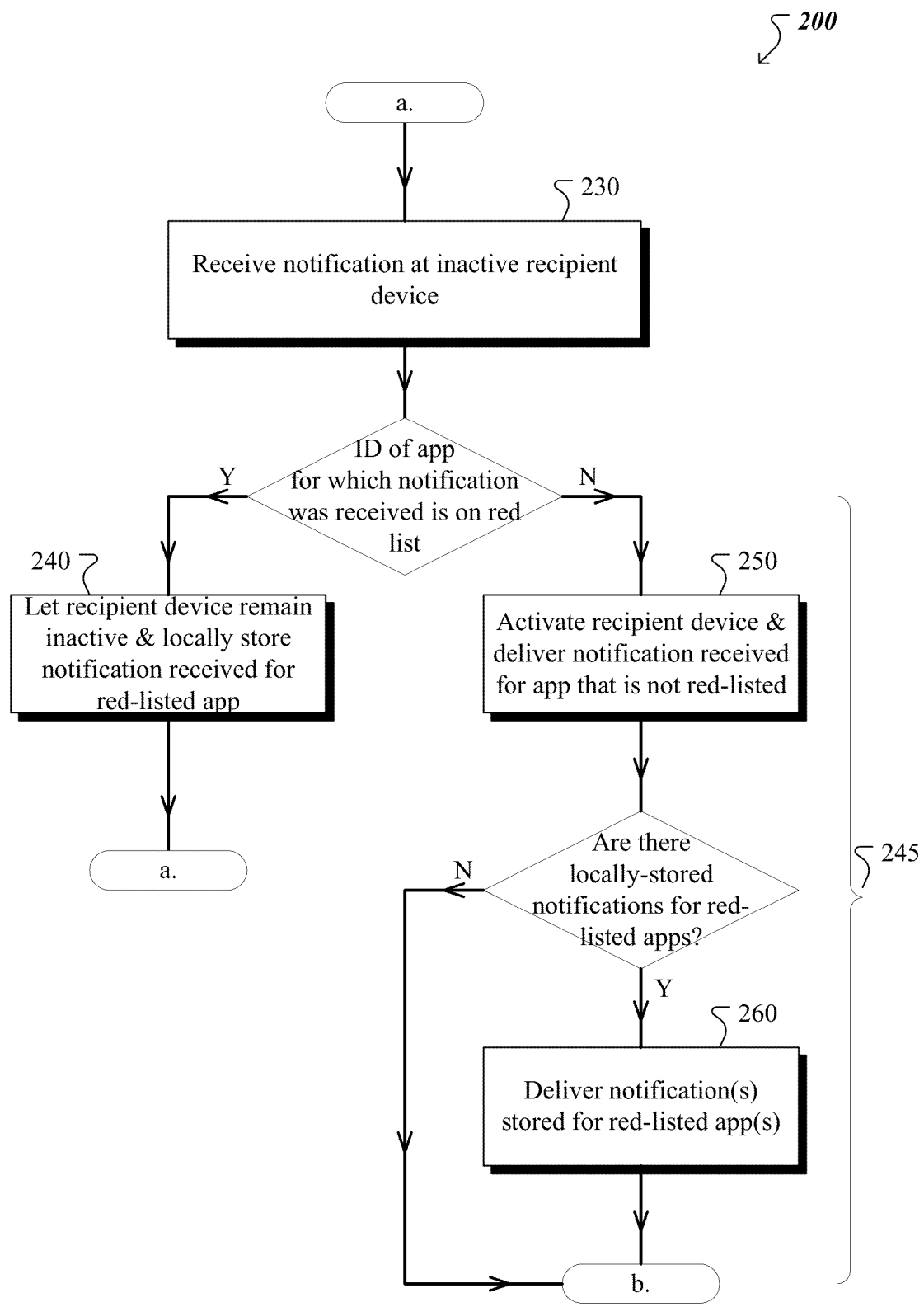
FIGS. 2A-2C are flow charts of an example of a process performed by a notification handler process running on a battery-powered computing device for selectively activating the device to deliver push notifications for apps installed on the device.
Figure 2B:
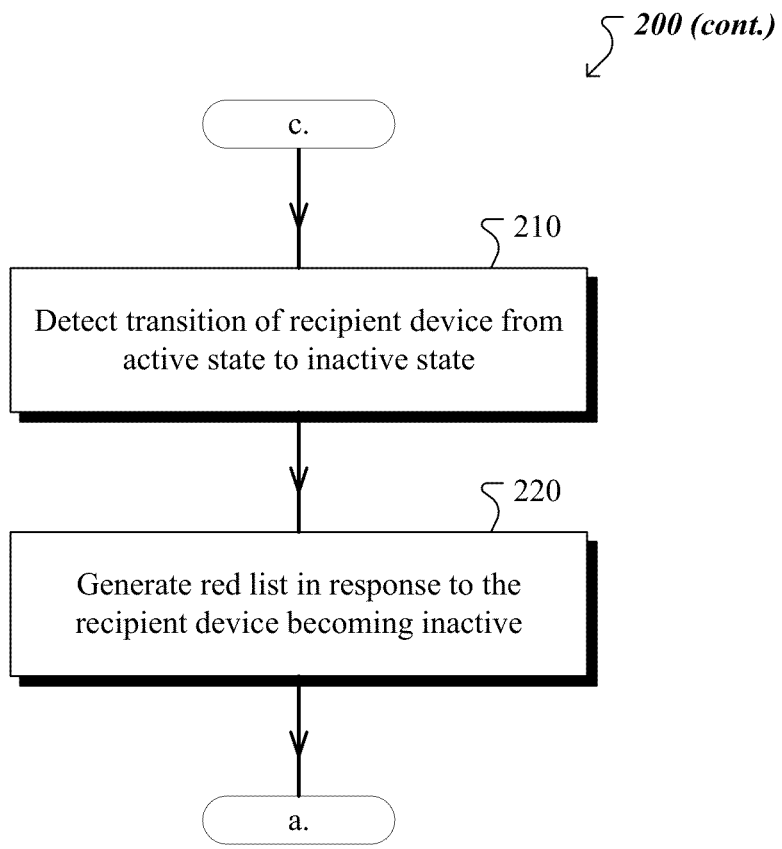
Figure 2C:
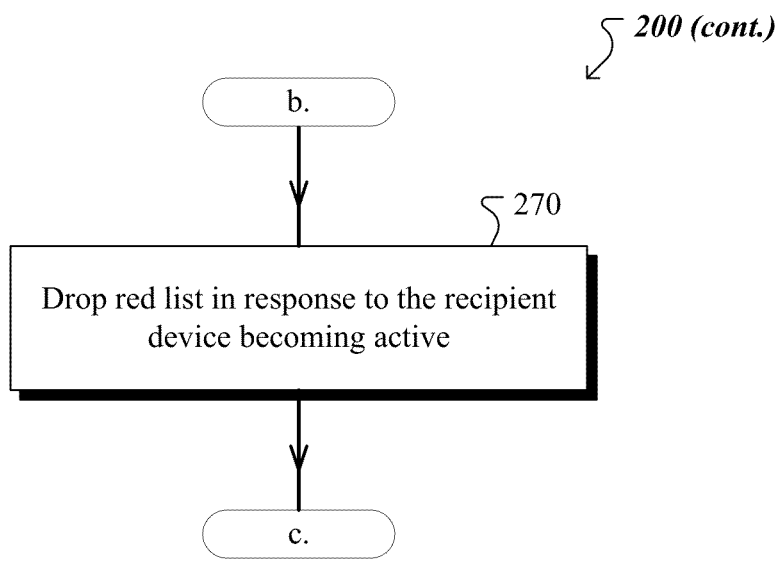

FIGS. 2A-2C are flow charts of an example of a process 200 performed by a notification handler running on a recipient device for selectively activating the device to deliver push notifications for apps installed on the device. The process 200 can be implemented in the system 100 described above in connection with FIG. 1.

At 230, a notification is received at an inactive recipient device. In the example illustrated in FIG. 1, the notification handler 152—running at the recipient device 150 while the device is in its inactive state—receives a notification for an app installed on the recipient device.

Here, a determination is performed whether an identifier of an app for which the notification was received is on a red list. In the example illustrated in FIG. 1, the notification handler 152—which maintains the red list 154 while the recipient device 150 is inactive—can check whether the app 158a for which a notification (B) was received is on the red list 154.

At 240, responsive to the determination that the app for which the notification was received is red-listed, the recipient device is instructed to remain inactive and the notification received for the red-listed app is locally stored. In the example illustrated in FIG. 1, responsive to the determination that the app 158a—for which the notification (B) was received—is red-listed, the notification handler 152 instructs the recipient device 150 to remain inactive and stores in the notification store 156 the notification (B) received for the red-listed app 158a.

Here, the process 200 returns to 230. At 230, another notification is received at the recipient device that is still inactive. The determination whether an identifier of an app for which the other notification was received is on the red list is performed next.

Responsive to the determination that the app for which the other notification was received is not on the red-list, branch 245 of the process 200 is performed in the following manner.

At 250, the recipient device is instructed to become active and the other notification received for the app that is not red-listed is delivered. In the example illustrated in FIG. 1, the notification handler 152 instructs the recipient device 150 to activate and delivers the notification (E) received for the app 158b that is not red-listed.

At this point, determination is performed whether any notifications are being locally stored at the now activated recipient device for red-listed apps.

Responsive to the determination that notification(s) is(are) being locally stored for red-listed app(s), at 260, the notification(s) stored for the red-listed app(s) are delivered. In the example illustrated in FIG. 1, responsive to the determination that notification (B) is stored for red-listed app 158a in the notification store 156, the notification handler 152 delivers the notification (B) stored for the red-listed app 158a.

The opportunistic delivery of the notification(s) stored locally for red-listed app(s) completes the branch 245 of the process 200. The branch 245 is also completed responsive to the determination that no notification(s) is(are) being locally stored for red-listed app(s).

A portion of the process 200—performed prior to the receiving, at 230, of the notification at the inactive recipient device—is described below in connection with FIG. 2B.

At 210, a transition of the recipient device from an active state to an inactive state is detected by the notification handler. For instance, this transition occurs to prolong battery life of the recipient device. In the example illustrated in FIG. 1, the notification handler 152 detects when the recipient device 150 transitions from being active to inactive.

Responsive to the detection that the recipient device has become inactive, at 220, the red list is generated by the notification handler. In the example illustrated in FIG. 1, responsive to the detection that the recipient device has become inactive, the notification handler 152 generates the red list 154.

Another portion of the process 200—performed either after the branch 245 is completed or prior to the detecting, at 210, of the transition of the recipient device from the active state to the inactive state—is described below in connection with FIG. 2B.

At 270, responsive to the recipient device becoming active, the red list is dropped by the notification handler.

Technologies described above for selectively activating a recipient device to deliver push notifications for apps installed on the device were implemented at a notification handler process running at the recipient device. Similar technologies can be implemented at the notification server 120, as described below.

Figure 3:
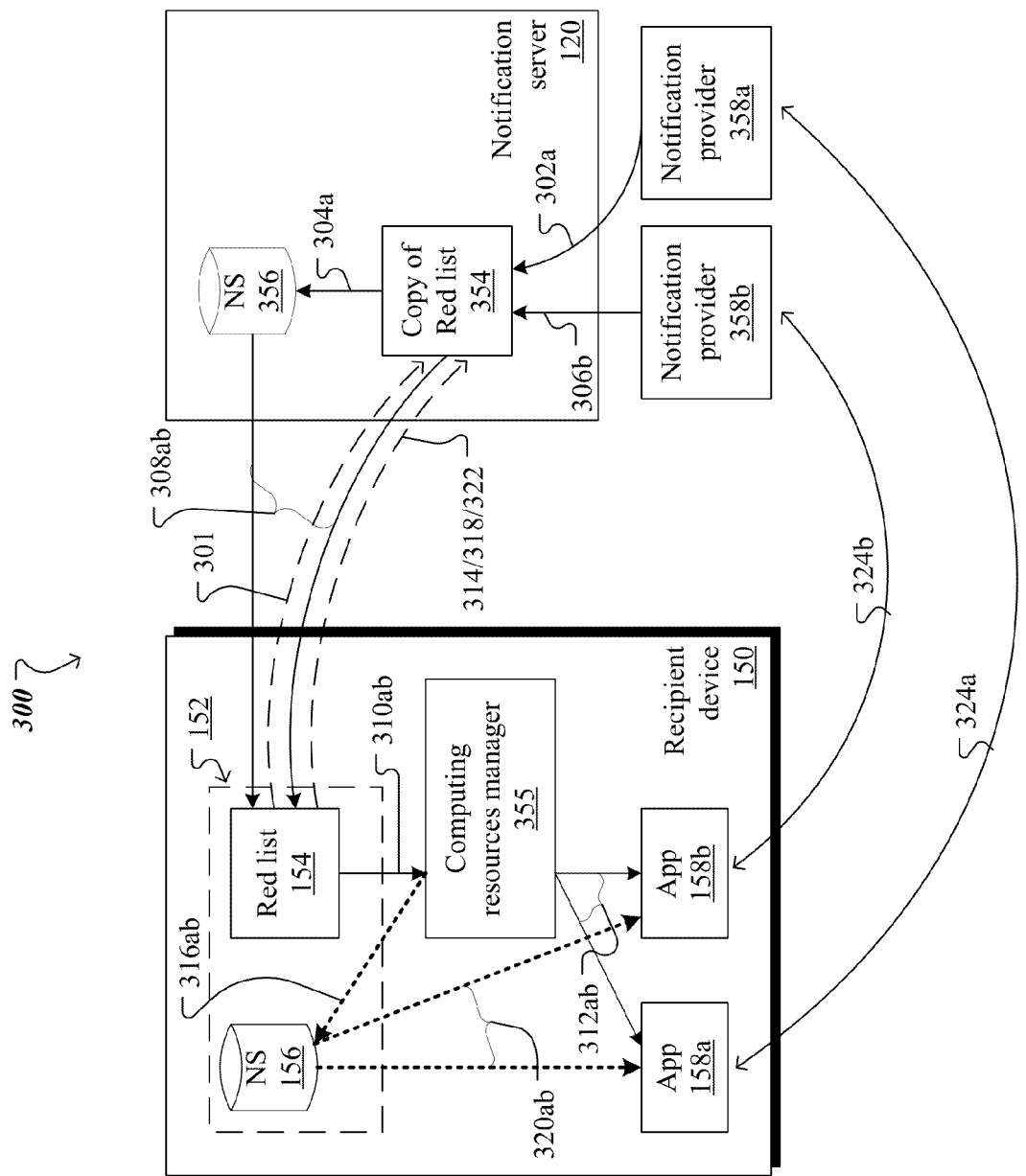
FIG. 3 illustrates an example of another system for selectively activating a battery-powered computing device to deliver push notifications for apps installed on the device.

Selectively Activating Recipient Device to Deliver Push Notifications Using Cloud-Based Notification Server FIG. 3 illustrates an example of another system 300 for selectively activating a recipient device 150 to deliver push notifications for apps installed on the device 150. In this example, the system 300 includes, in addition to the recipient device 150, notification provider systems 358a, 358b and a cloud-based notification service.

Here, multiple apps, e.g., app 158a, 158b, etc., are installed on the recipient device 150. Additionally, a notification handler 152 and a computing resources manager 355 also run on the recipient device 150.

As described above in connection with FIG. 1, the notification handler 152 represents a local component of the cloud-based notification system and functions in the following manner. When the recipient device 150 is in an inactive state, the notification handler 152 selectively activates the recipient device 150 upon receipt of push notifications based on whether the push notifications are received for apps referenced in a red list 154. If the push notifications are received for red-listed apps, the notification handler 152 stores the received notifications in a notification store 156 for later, opportunistic delivery. Else, if the push notifications are received for apps that are not red-listed, the notification handler 152 instructs activation of the recipient device 150 and delivers the push notifications received for the apps that are not red-listed. As the cost of activating the recipient device 150 has already been paid, the notification handler 152 also delivers the notifications stored in the notification store 156 for the red-listed apps.

Further as described above in connection with FIG. 1, the notification server 120 represents a remote component of the cloud-based notification system. In the example illustrated in FIG. 3, the notification server 120 works in conjunction with the notification handler 152 to push notifications for apps installed on the recipient device 150 based on the red list 154.

Here, the notification handler 152 provides (301) a copy of the red list 154 to the notification server 120 when the recipient device 150 transitions from the active state to the inactive state. The red list copy 354 is used by the notification server 120 in the following manner.

A notification provider 358a associated with the app 158a installed on the recipient device 150 transmits (302a) a first notification to the notification server 120. The received first notification includes an identifier of the app 158a and an identifier of the recipient device 150. The notification server 120 verifies whether the identifier of the app 158a is on the red list copy 354. In this case, the notification server 120 determines that the app 158a for which the first notification was received is red-listed. Responsive to the determining that the app 158a for which the first notification was received is red-listed, the notification server 120 stores (304a) the first notification in a cloud-based notification store 356 for later opportunistic delivery to the recipient device 150.

Another notification provider 358b associated with the app 158b installed on the recipient device 150 transmits (306b) a second notification to the notification server 120. The received second notification includes an identifier of the app 158b and the identifier of the recipient device 150. The notification server 120 verifies whether the identifier of the app 158b is on the red list copy 354. In this case, the notification server 120 determines that the app 158b for which the second notification was received is not on the red list copy 354. Responsive to the determining that the app 158b for which the second notification was received is not on the red list copy 354, the notification server 120 pushes (308ab) to the recipient device 150 the second notification received for the app 158b that is not red-listed and may in some implementations immediately push the first notification stored for the red-listed app 158a, as in the following manner.

As among the first and second notifications received (308ab), by the notification handler 152 from the notification server 120, at least one is for an app (app 158b) that is not red-listed, the notification handler 152 instructs (310ab) the computing resources manager 355 to activate the recipient device 150. Here, a determination is performed by the computing resources manager 355 whether it is OK to activate the recipient device 150. Factors taken into account for this determination are remaining battery life, need for additional communication bandwidth, environmental conditions, etc. Responsive to the determination by the computing resources manager 355 that it is OK to activate the recipient device 150, the notification handler 152 causes the recipient device 150 to become active and delivers (312ab) the second notification to the app 158b and the first notification to the app 158a. As the recipient device 150 is now active, the notification handler 152 drops the red list 154 and also instructs (314) the notification server 120 to drop the red list copy 354.

Alternatively, responsive to the determination by the computing resources manager 355 that it is not OK to activate the recipient device 150, the notification handler 152 stores (316ab) the first and second notifications in the local notification storage 156 without activating the recipient device 150. In this case, the notification handler 152 may choose to update the red list 154 by adding the identifier of the application 158b to it, and then provide (318) an updated red list copy 354 to the notification service 120. At a later time, the computing resources manager 355 can determine that it is now OK to activate the recipient device 150. Responsive to the determination by the computing resources manager 355 that it is now OK to activate the recipient device 150, the notification handler 152 causes the recipient device 150 to become active and delivers (320ab) the second notification to the app 158b and the first notification to the app 158a. As the recipient device 150 is now active, the notification handler 152 drops the red list 154 and also instructs (322) the notification server 120 to drop the red list copy 354.

Once it receives the first notification, the app 158a may connect (324a) directly to the first notification provider 358a to address information provided in the first notification, e.g., a calendar update, an image gallery update, etc. Similarly, once it receives the second notification, the app 158b may connect (324b) directly to the second notification provider 358b to address information provided in the second notification, e.g., an incoming VoIP/video call, a message relating to locating the recipient device 150, etc.

Figure 4:
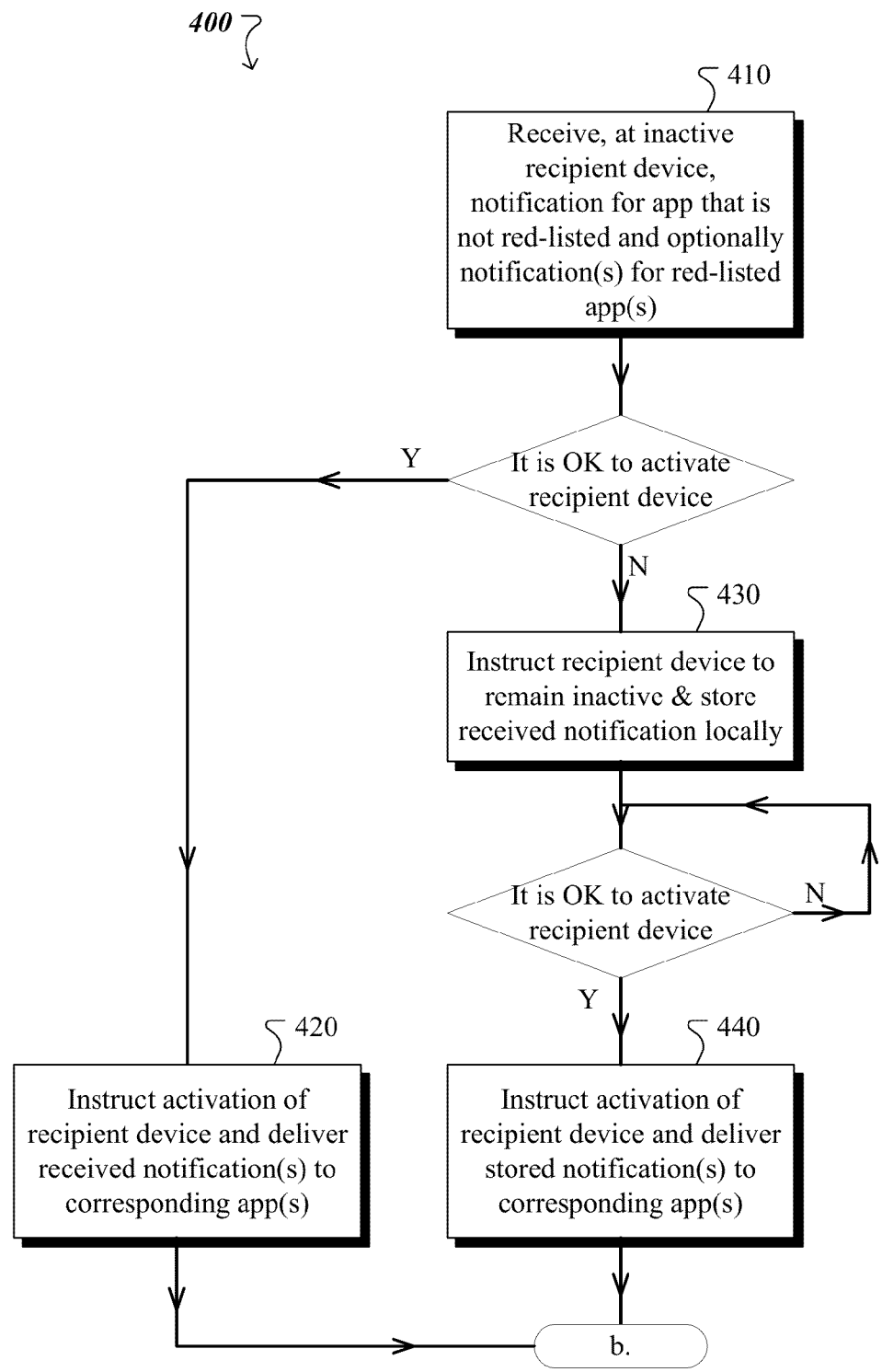
FIG. 4 is a flow chart of an example of another process performed by a notification handler process running on a battery-powered computing device for selectively activating the device to deliver push notifications for apps installed on the device.

FIG. 4 is a flow chart of an example of another process 400 performed by a recipient device for selectively activating the device to deliver push notifications for apps installed on the device. The process 400 can be implemented in the system 300 described above in connection with FIG. 3.

At 410, a notification is received at an inactive recipient device for an app that is not red-listed. Optionally, one or more additional notifications for red-listed app(s) can be received concurrently with the notification for the app that is not red-listed. In the example illustrated in FIG. 3, a notification handler 152 receives (308ab) from a notification server 120 a second notification for app 158b that is not red-listed and a first notification for red-listed app 158a.

Here, a determination is performed whether it is OK to activate the recipient device. In the example illustrated in FIG. 3, a computing resources manager 355 performs a determination whether it is OK to activate the recipient device 150.

Responsive to the determination that it is OK to activate the recipient device, at 420, the recipient device is instructed to become active and the received notification(s) is(are) delivered to corresponding app(s). In the example illustrated in FIG. 3, the notification handler 152 instructs the recipient device 150 to activate and delivers (312ab) the first notification to the app 158a and the second notification to the app 158b.

Alternatively, responsive to the determination that it is not OK to activate the recipient device, at 430, the received notification(s) is(are) locally stored without activating the recipient device. In the example illustrated in FIG. 3, the notification handler 152 stores the received first and second notifications in the notification store 156 without instructing the recipient device 150 to activate.

Here, the determination whether it is OK to activate the recipient device is performed repeatedly until a positive result is determined. In the example illustrated in FIG. 3, the computing resources manager 355 repeats the determination whether it is OK to activate the recipient device 150 until a positive result is determined.

Responsive to a result of the repeated determinations being that it is OK to activate the recipient device, at 440, the recipient device is instructed to become active and the locally stored notification(s) is(are) delivered to corresponding app(s). In the example illustrated in FIG. 3, the notification handler 152 instructs the recipient device 150 to activate and delivers (320ab) the first notification to the app 158a and the second notification to the app 158b.

Once the recipient device has been activated, the portion of the process 200 shown in FIG. 2C can be performed to drop the red list, at 270. In the example illustrated in FIG. 3, the notification handler 152 drops (314 or 322) the red list 154.

Figure 5:
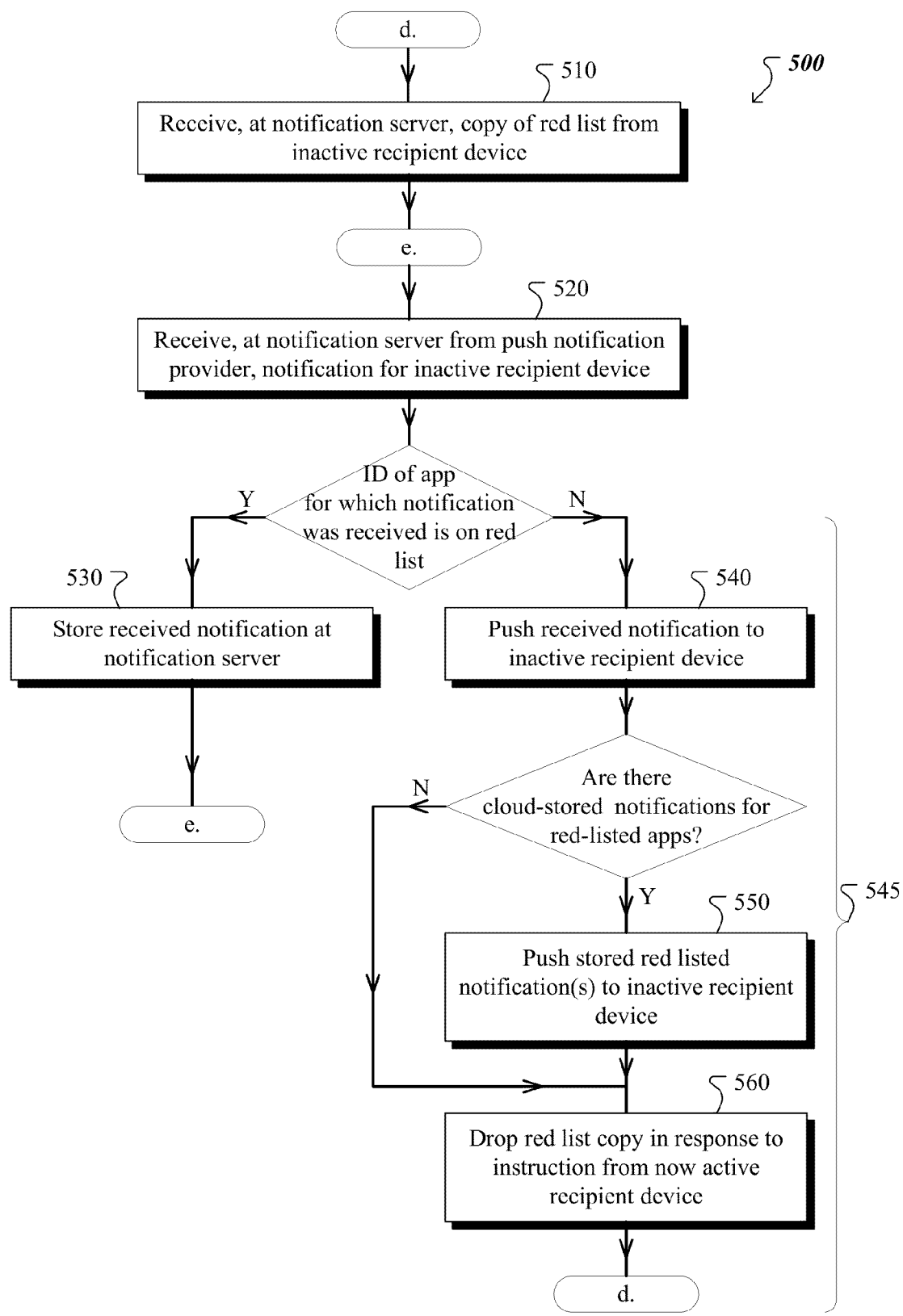
FIG. 5 is a flow chart of an example of a process performed by a cloud-based notification server for selectively activating a battery-powered computing device to deliver push notifications for apps installed on the device.

FIG. 5 is a flow chart of an example of a process 500 performed by a notification server for selectively pushing, to an inactive recipient device, notifications for apps installed on the device. The process 500 can be implemented in the system 300 described above in connection with FIG. 3.

At 510, a copy of a red list is received at the notification server from a recipient device that is in an inactive state. In the example illustrated in FIG. 3, a notification server 120 receives (301) a red list copy 354 from an inactive recipient device 150.

At 520, a push notification for the recipient device is received at the notification server from a push notification provider while the recipient device that is still inactive. In the example illustrated in FIG. 3, the notification server 120 receives (302a) a first notification for an app 158a installed on the recipient device 150 from a push notification provider 358a associated with the app 158a.

Here, a determination is performed whether an identifier of the app for which the notification was received is on the red list copy. In the example illustrated in FIG. 3, the notification server 120—which maintains the red list copy 354 while the recipient device 150 is inactive—can check whether the app 158a for which the first notification was received (302a) is on the red list copy 354.

At 530, responsive to the determination that the app for which the notification was received is red-listed, the notification received for the red-listed app is locally stored in a cloud-based storage. In the example illustrated in FIG. 3, responsive to the determination that the app 158a—for which the first notification was received (302a)—is red-listed, the notification server 120 stores (304a) in a notification store 356 the first notification received for the red-listed app 158a.

Here, the process 500 returns to 520. At 520, another notification is received at the notification server from another push notification provider while the recipient device that is still inactive. In the example illustrated in FIG. 3, the notification server 120 receives (306b) a second notification for an app 158b installed on the recipient device 150 from a second push notification provider 358b associated with the app 158b. The determination whether an identifier of an app for which the other notification was received is on the red list copy is performed next.

Responsive to the determination that the app for which the other notification was received is not on the red-list copy, branch 545 of the process 500 is performed in the following manner.

At 540, the other notification received for the app that is not red-listed is pushed to the inactive recipient device. In the example illustrated in FIG. 3, the notification server pushes (308ab) to the inactive recipient device 150 the second notification received for the app 158b that is not red-listed.

At this point, determination is performed whether any notifications are being stored at the notification server for red-listed apps.

Responsive to the determination that notification(s) is(are) being stored at the notification server for red-listed app(s), at 550, the notification(s) stored for the red-listed app(s) are pushed to the inactive recipient device. In the example illustrated in FIG. 3, responsive to the determination that the first notification is stored (304a) for red-listed app 158a in the cloud notification store 356, the notification server 120 pushes (308ab) to the inactive recipient device 150 the first notification stored for the red-listed app 158a.

After pushing to the inactive recipient device the notification received for the app that is not red-listed, optionally along with one or more notifications stored for red-listed apps, the notification server can receive an instruction from the now active recipient device to drop the red list copy.

At 560, responsive to the receiving from the active recipient device of the instruction to drop the red list copy, the red list copy is dropped. In the example illustrated in FIG. 3, responsive to receiving (314 or 322) from the active recipient device 150 of an instruction to drop the red list copy 354, the notification server 120 drops the red list copy 354.

Example of a System Architecture

Figure 6:
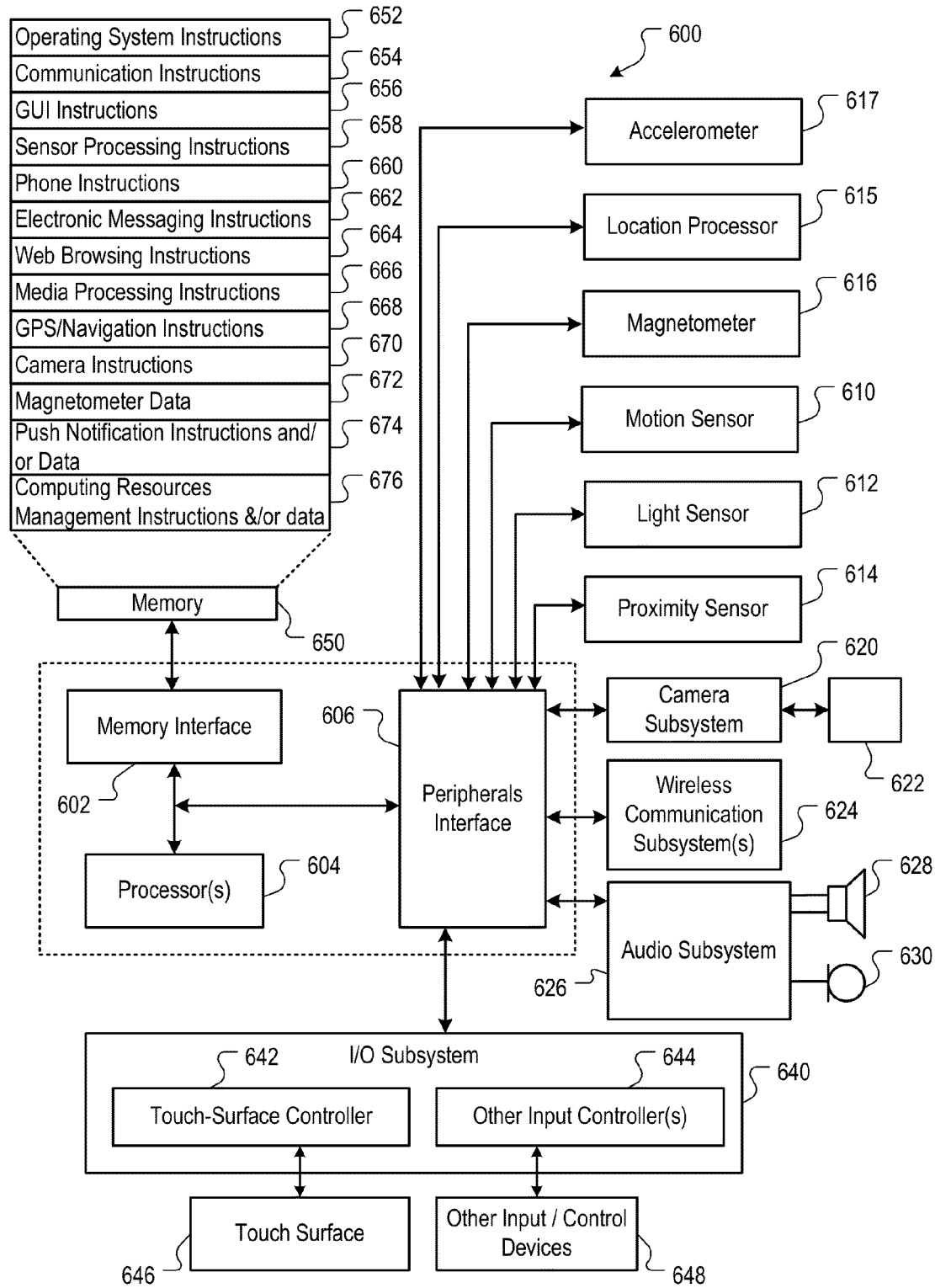
FIG. 6 is a block diagram of an example computing device that can implement the technologies described in connection with FIGS. 1, 2A-2C and 3-5.

FIG. 6 is a block diagram of an example computing device 600 that can implement the features and processes of FIGS. 1, 2A-2C and 3-5. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device 100 can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voice printing and voice authentication, for example.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing dynamic adjustment of the mobile device based on user activity. For example, operating system 652 can implement aspects of the system 100 described above in connection with FIG. 1, and/or aspects of the processes 200, 400 and/or 500 described above in connection with FIGS. 2A-2C and 3-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can also store other software instructions 670, such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

The memory 650 can store software instructions 674 to facilitate processes and functions for push notifications, or other software instructions 676 to facilitate processes and functions for computing resources management, as described with reference to FIGS. 1, 2A-2C and 3-5.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a notification handler process running on a recipient device, the method comprising:
   receiving a first push notification for a first application while the recipient device is in an inactive state;
   determining that delivery of the first push notification would cause the recipient device to transition into an active state without prompting a user associated with the recipient device to interact with the first application, wherein the determining that delivery of a push notification would cause the recipient device to transition into the active state without prompting the user to interact with a particular application comprises:
      parsing a record of restricted application identifiers stored at the recipient device, the restricted application identifiers corresponding to applications installed on the recipient device for which delivery of push notifications would cause the recipient device to transition into the active state without prompting the user to interact with the respective installed application, and
      finding an identifier of the first application among the restricted application identifiers of the stored record;
   in response to the determining that delivery of a push notification would cause the recipient device to transition into the active state without prompting the user to interact with a particular application, storing the first push notification at the recipient device;
   receiving a second push notification for a second application while the recipient device continues to be in the inactive state;
   determining that delivery of the second push notification would cause the recipient device to transition into the active state prompting the user to interact with the second application; and
   in response to the determining that delivery of the second push notification would cause the recipient device to transition into the active state prompting the user to interact with the second application, delivering the received second push notification to the second application and the stored first push notification to the first application.

2. The method of claim 1, wherein the determining that delivery of a push notification would cause the recipient device to transition into the active state prompting the user to interact with the second application comprises
   parsing the record of restricted application identifiers stored at the recipient device without finding the identifier of the second application among the restricted application identifiers of the stored record.

3. The method of claim 1, further comprising
   generating the record of restricted application identifiers upon detecting that the recipient device transitions from the active state to the inactive state.

4. The method of claim 3, further comprising
   generating a first record of application identifiers comprising application identifiers of applications installed on the recipient device,
   wherein the generating of the record of restricted application identifiers comprises removing from the first record of application identifiers the application identifiers of ones from among the installed applications that indicated, to the notification handler process via either user input or an API, that receipt of push notifications would prompt the user to interact with the respective installed application.

5. The method of claim 3, further comprising
   transmitting, via a public IP connection to a notification server associated with the notification handler process, a copy of the record of restricted application identifiers generated by the recipient device, such that the notification server can (i) temporarily store, at the notification server, push notifications for applications installed on the recipient device that have application identifiers included on the copy of the record of restricted application identifiers, and (ii) opportunistically push the stored notifications along with a notification for an application installed on the recipient device that has an unrestricted application identifier.

6. The method of claim 1, further comprising
incrementing a count of user disinterest with respect to the second application upon detecting that the user fails to interact with the second application prior to the recipient device transitioning from the active state back to the inactive state, and
if the count exceeds a predetermined count,
including an application identifier of the second application to the record of restricted application identifiers when generating at least some of subsequent instances of the record of restricted application identifiers, and
resetting the count to zero.

7. The method of claim 1, further comprising
removing the record of restricted application identifiers from the recipient device's storage upon detecting that the recipient device transitions from the inactive state to the active state.

8. The method of claim 7, further comprising
receiving a third push notification for the first application while the recipient device continues to be in the active state; and
delivering the received third push notification to the first application without having to store the third push notification at the recipient device.

9. The method of claim 7, further comprising
transmitting, via a public IP connection to a notification server associated with the notification handler process, an instruction to remove a copy of the record of restricted application identifiers—provided by the recipient device—from storage at the notification server.

10. The method of claim 1, wherein the recipient device is in the inactive state when at least a display of the recipient device is dark while the recipient device is running on battery power.

11. The method of claim 1, wherein the delivering of the received second push notification to the second application and the stored first push notification to the first application comprises requesting an indication from a resource manager process running on the recipient device whether transitioning the recipient device from the inactive state to the active state in response to the delivery of the first and second push modifications would cause performance of the recipient device to degrade below an acceptable performance threshold.

12. The method of claim 1, further comprising
receiving a fourth push notification for the second application after the recipient device returned to the active state;
requesting an indication from a resource manager process running on the recipient device to determine whether transitioning the recipient device from the inactive state to the active state in response to delivery of the fourth push modification would cause performance of the recipient device to degrade below an acceptable performance threshold; and
upon receiving a first indication, from the resource manager process, that transitioning the recipient device inactive state to the active state in response to delivery of the fourth push modification would cause performance of the recipient device to degrade below an acceptable performance threshold, instructing the recipient device to remain inactive and storing the fourth push notification at the recipient device along with any other push notification(s) stored at the recipient device.

13. The method of claim 12, further comprising
receiving, from the resource manager process after the receiving of the first indication, a second indication that transitioning the recipient device from the inactive state to the active state would not cause the performance to degrade below the acceptable performance threshold; and
in response to receiving the second indication, instructing activation of the recipient device and delivering the stored fourth push notification to the second application along with any other stored push notification(s).

14. A computing device comprising:
one or more hardware processors; and
non-transitory computer readable medium encoding instructions that, when executed by the one or more hardware processors, cause the one or more hardware processors to emulate a notification handler that performs operations comprising:
receiving a first push notification for a first application while the computing device is in an inactive state;
determining that delivery of the first push notification would cause the computing device to transition into an active state without prompting a user associated with the computing device to interact with the first application, wherein the operation of determining that delivery of a push notification would cause the computing device to transition into the active state without prompting the user to interact with the first application comprises:
parsing a record of restricted application identifiers stored at the computing device, the restricted application identifiers corresponding to applications installed on the computing device for which delivery of push notifications would cause the computing device to transition into the active state without prompting the user to interact with the respective installed application, and
finding an identifier of the first application among the restricted application identifiers of the stored record;
in response to determining that delivery of a push notification would cause the computing device to transition into the active state without prompting the user to interact with a particular application, storing the first push notification at the computing device;
receiving a second push notification for a second application while the computing device continues to be in the inactive state;
determining that delivery of the second push notification would cause the computing device to transition into the active state prompting the user to interact with the second application; and
in response to determining that delivery of the second push notification would cause the computing device to transition into the active state prompting the user to interact with the second application, delivering the received second push notification to the second application and the stored first push notification to the first application.

15. The computing device of claim 14, wherein the operation of determining that delivery of a push notification would cause the computing device to transition into the active state prompting the user to interact with the second application comprises parsing the record of restricted application identifiers stored at the computing device without finding the identifier of the second application among the restricted application identifiers of the stored record.

16. The computing device of claim 14, wherein the operations further comprise generating the record of restricted application identifiers upon detecting that the computing device transitions from the active state to the inactive state.

17. The computing device of claim 16, wherein the operations further comprise:
- generating a first record of application identifiers comprising application identifiers of applications installed on the computing device,
- wherein the operation of generating of the record of restricted application identifiers comprises removing from the first record of application identifiers the application identifiers of ones from among the installed applications that indicated, to the notification handler process via either user input or an API, that receipt of push notifications would prompt the user to interact with the respective installed application.

18. The computing device of claim 16, wherein the operations further comprise transmitting, via a public IP connection to a notification server associated with the notification handler process, a copy of the record of restricted application identifiers generated by the computing device, such that the notification server can (i) temporarily store, at the notification server, push notifications for applications installed on the computing device that have application identifiers included on the copy of the record of restricted application identifiers, and (ii) opportunistically push the stored notifications along with a notification for an application installed on the computing device that has an unrestricted application identifier.

19. The computing device of claim 14, wherein the operations further comprise:
- incrementing a count of user disinterest with respect to the second application upon detecting that the user fails to interact with the second application prior to the computing device transitioning from the active state back to the inactive state, and
- if the count exceeds a predetermined count,
  - including an application identifier of the second application to the record of restricted application identifiers when generating at least some of subsequent instances of the record of restricted application identifiers, and
  - resetting the count to zero.

20. The computing device of claim 14, wherein the operations further comprise removing the record of restricted application identifiers from the computing device's storage upon detecting that the computing device transitions from the inactive state to the active state.

21. The computing device of claim 20, wherein the operations further comprise:
- receiving a third push notification for the first application while the computing device continues to be in the active state; and
- delivering the received third push notification to the first application without having to store the third push notification at the computing device.

22. The computing device of claim 20, wherein the operations further comprise transmitting, via a public IP connection to a notification server associated with the notification handler, an instruction to remove a copy of the record of restricted application identifiers—provided by the computing device—from storage at the notification server.

23. The computing device of claim 14, wherein the computing device is in the inactive state when at least a display of the computing device is dark while the computing device is running on battery power.

24. The computing device of claim 14, wherein the operation of delivering of the received second push notification to the second application and the stored first push notification to the first application comprises requesting an indication from a resource manager process running on the computing device whether transitioning the computing device from the inactive state to the active state in response to the delivery of the first and second push modifications would cause performance of the computing device to degrade below an acceptable performance threshold.

25. The computing device of claim 14, wherein the operations further comprise:
- receiving a fourth push notification for the second application after the computing device returned to the active state;
- requesting an indication from a resource manager process running on the computing device whether transitioning the computing device from the inactive state to the active state in response to delivery of the fourth push modification would cause performance of the computing device to degrade below an acceptable performance threshold; and
- upon receiving a first indication, from the resource manager process, that transitioning the computing device inactive state to the active state in response to delivery of the fourth push modification would cause performance of the computing device to degrade below an acceptable performance threshold, instructing the computing device to remain inactive and storing the fourth push notification at the computing device along with any other push notification(s) stored at the computing device.

26. The computing device of claim 25, wherein the operations further comprise:
- receiving, from the resource manager process after the receiving of the first indication, a second indication that transitioning the computing device from the inactive state to the active state would not cause the performance to degrade below the acceptable performance threshold; and
- in response to receiving the second indication, instructing activation of the computing device and delivering the stored fourth push notification to the second application along with any other stored push notification(s).

* * * * *